United States Patent
Patel et al.

(10) Patent No.: US 8,850,066 B2
(45) Date of Patent: Sep. 30, 2014

(54) DYNAMICALLY ASSIGNING UNIQUE ADDRESSES TO ENDPOINTS

(75) Inventors: Alpesh S. Patel, Morrisville, NC (US); Kent K. Leung, Los Altos, CA (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 12/128,454

(22) Filed: May 28, 2008

(65) Prior Publication Data

US 2009/0300217 A1 Dec. 3, 2009

(51) Int. Cl.
*G06F 15/16* (2006.01)
*H04L 29/12* (2006.01)
*H04W 8/26* (2009.01)
*H04W 80/04* (2009.01)

(52) U.S. Cl.
CPC ........ *H04L 61/2084* (2013.01); *H04L 61/6059* (2013.01); *H04L 61/203* (2013.01); *H04L 29/12311* (2013.01); *H04L 29/12933* (2013.01); *H04L 61/1511* (2013.01); *H04W 80/04* (2013.01); *H04L 29/12226* (2013.01); *H04L 61/2015* (2013.01); *H04L 61/6068* (2013.01); *H04L 29/12066* (2013.01); *H04L 29/12915* (2013.01); *H04W 8/26* (2013.01)
USPC ........................................ 709/245

(58) Field of Classification Search
USPC ........................................ 709/245
See application file for complete search history.

(56) References Cited

U.S. PATENT DOCUMENTS

| | | | | |
|---|---|---|---|---|
| 7,447,800 B2 * | 11/2008 | Kobayashi et al. | ........... | 709/242 |
| 2005/0228893 A1 * | 10/2005 | Devarapalli et al. | ........... | 709/228 |
| 2006/0104247 A1 * | 5/2006 | Dommety et al. | ............ | 370/338 |
| 2007/0153794 A1 * | 7/2007 | Smith et al. | ................... | 370/390 |
| 2009/0307485 A1 * | 12/2009 | Weniger et al. | ............... | 713/153 |
| 2010/0091707 A1 * | 4/2010 | Janneteau et al. | ............ | 370/328 |

FOREIGN PATENT DOCUMENTS

WO 03096650 A1 11/2003

* cited by examiner

*Primary Examiner* — Krista Zele
*Assistant Examiner* — James Forman
(74) *Attorney, Agent, or Firm* — Patterson + Sheridan, LLP

(57) ABSTRACT

The present disclosure generally provides techniques for establishing a unique, ephemeral home address (hoa)/home agent address (ha') address pair that may be limited to use in a session having a defined lifetime. Limiting the use of this dynamic address pair to a session lifetime and by preventing a mobile node from knowing the static address of a home agent may help protect the home agent from attacks.

20 Claims, 3 Drawing Sheets

US 8,850,066 B2

DYNAMICALLY ASSIGNING UNIQUE ADDRESSES TO ENDPOINTS

TECHNICAL FIELD

Embodiments of the present disclosure generally relate to Mobile IP network technology.

BACKGROUND

In IP communications, a set of end points have either fixed or dynamic addresses. Dynamic addressing (either public or private) can be achieved using dynamic host configuration protocol (DHCP); authentication, authorization accounting protocol (AAA); or other protocols known by those skilled in the art. However, even with dynamic addressing, typically only clients have a dynamic address, while server addresses are typically fixed.

Mobile IP is a protocol which allows transparent routing of IP datagrams (or packets) to laptop computers or other mobile clients (referred to as "Mobile Nodes" herein), enabling the mobile nodes (MN) to roam between various sub-networks at various locations—while maintaining internet and/or WAN connectivity. Without Mobile IP or a similar protocol, a Mobile Node would be unable to stay connected while roaming through various sub-networks because the IP address required for any node to communicate over the internet is location specific. Each IP address has a field that specifies the particular sub-network on which the node resides. While away from home, a MN is associated with a home agent address HA', which is traditionally static, and gives information about the MN's current locations. Mobile IP specifies how a MN registers with its home agent (HA) and how the HA routes packets to the MN through a tunnel.

Unfortunately, the fact that the static HA' is known to the MN may lead the home agent open to attacks.

SUMMARY

One embodiment of the present disclosure provides methods and apparatus for dynamically assigning an address pair for use in a communications session between a mobile node device and a home agent device.

The method generally includes receiving a request to configure a dynamic home agent address for the home agent and a dynamic home address of the mobile node device for use during the session, configuring the dynamic home agent address as a virtual address associated with the home address of the mobile node device, establishing a tunnel between the dynamic home agent address and the dynamic home address for exchanging data between the home agent device and the mobile node device without the mobile node device having knowledge of a static address of the home agent device, and transmitting a request for the mobile node device to discard the dynamic home agent address after the session has ended.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of the scope of the present disclosure or claims presented herein.

DESCRIPTION OF EXAMPLE EMBODIMENTS

The present disclosure generally provides techniques for establishing a unique, ephemeral Home Address (HoA)/Home Agent Address (HA') address pair that may be limited to use in a session having a defined lifetime. Limiting the use of this dynamic address pair to a session lifetime and by preventing a mobile node from knowing the static address of a home agent may help protect the home agent from attacks.

For some embodiments, the dynamic IP address may be generated in accordance with known protocols and may, in fact, be facilitated by a greater address range offered by newer versions of such protocols. For example, for some embodiments, IP addresses may be generated with a 64 bit prefix in accordance with Mobile IPv6 protocol. The techniques may be utilized, for example, in applications where a mobile client communicates with a static home agent with some additional mediation (e.g., provided by AAA during access authentication) to provide the static home agent with additional security against outside, brute force attacks.

In traditional Mobile IP operations, a Mobile Node (MN) may get a home address (HoA) during bootstrapping via an authentication, authorization accounting protocol (AAA) brokering mechanism. This is done to reduce the configuration needs on the MN (e.g., cell phones), which number in the millions in the United States. The MN may perform a radio authentication followed by level 3 (L3) (access) authentication via the AAA server.

Upon successful authentication, the MN may receive the HoA and the Home Agent Address (HA'). The HA' is traditionally fixed, though it may be dynamically assigned from a small set of addresses. For example, an operator may have 4 sets of HAs in the 4 corners of the United States. Accordingly, the static HA' may be known to the MN and is, therefore, open to attacks. However, by dynamically assigning unique IP address pairs to endpoints, the techniques presented herein may help prevent and/or protect against such attacks.

An Exemplary Network Architecture

Figure 1:
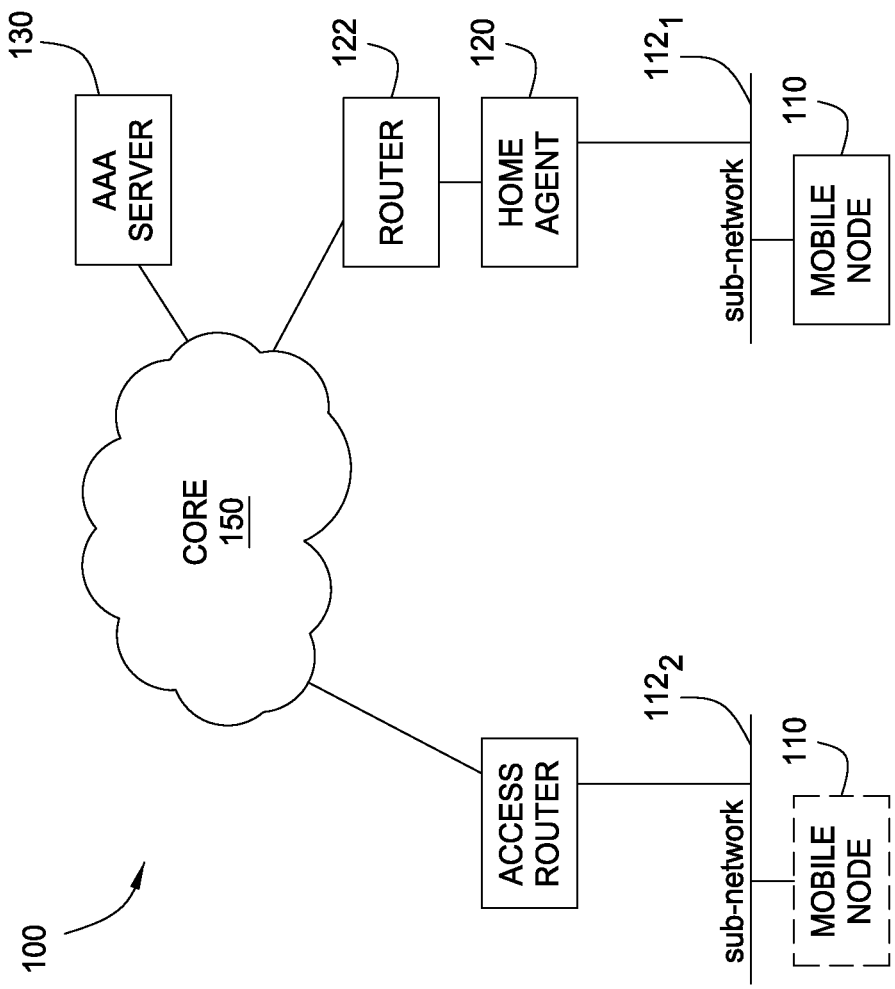
FIG. 1 illustrates a block diagram of an example network topology in accordance with some embodiments of the present disclosure.

FIG. 1 is a block diagram depicting a network 100, in which embodiments of the present disclosure may be utilized. As illustrated, the network 100 may contain a MN 110 (for example a laptop computer or internet enabled cellular phone) for sending data traffic to the Internet (represented by a 'CORE' cloud 150) via a sub-network 112 and a router.

In some instances, a MN 110 may access the core 150 from a primary geographic location. To do so, the MN 110 may be a member of a primary sub-network $112_1$, which allows its network entities to communicate over the core 150 through a Home Agent (HA) device 120 (e.g., a Cisco mobile router or mobile ipv6 home agent). Note that HA 120 need not directly connect to the core 150. For example, as shown in FIG. 1, the HA 120 may connect to the core 150 through another router 122. Additionally, router 122 may connect one or more other routers with the Internet (not shown).

In other instances, a MN 110 may roam to an alternative geographic location and access the core 150. To do so, the MN 110 may access an alternative sub-network $112_2$, which allows its network entities to communicate over the core 150 through an access router (AR) 140, which doubles as a Foreign Agent (FA). MN 110 may identify AR 140 through various agent solicitations and agent advertisements which form part of the Mobile IP protocol. When MN 110 engages with alternative sub-network $112_2$, MN 110 may compose a registration request for the HA 120 to bind MN's 110 current location address with its home location address. AR 140 then relays the registration request to HA 120. During the registration process, the HA 120 and the MN 110 may then negotiate the conditions of the MN's attachment to AR 140. When the negotiation is successfully completed, HA 120 may update an internal "mobility binding table" which links the MN's current location to the identity of MN 110.

Recent advancements may help enable the dynamic address assignment techniques presented herein. For example, Internet communications are currently employing an Internet Protocol version 6 (IPv6) standard that provides a larger (128 bit) address space, stateless address autoconfiguration (SLAAC), additional network-layer security, and simpler processing by routers, among other features, when compared to previous versions of this protocol. The large address space may permit novel address implementations not feasible in previous versions of the standard (e.g., IPv4). For example, a larger address space may allow the generation of additional addresses allowing for establishing a unique, ephemeral HoA/HA' address pair in accordance with the present disclosure, where both endpoints have dynamic IP addresses with a 64 bit prefix.

For certain embodiments of the present disclosure, the binding of the dynamic home address HoA and the dynamic home agent address HA' may be negotiated through an AAA server 130. In such embodiments, the AAA server 130 may generate a unique HoA/HA' address pair in the same 64 bit prefix and assign the dynamic home address HoA to the MN 110 while assigning the dynamic home agent address HA' to a specific HA 120.

As a result, the static address of the HA 120 may only be known by the AAA server and not the MN 110 which may help prevent attacks against the HA 120. The HA 120 may configure the dynamic home agent address HA' as a loopback address (i.e., virtual address).

Figure 2:
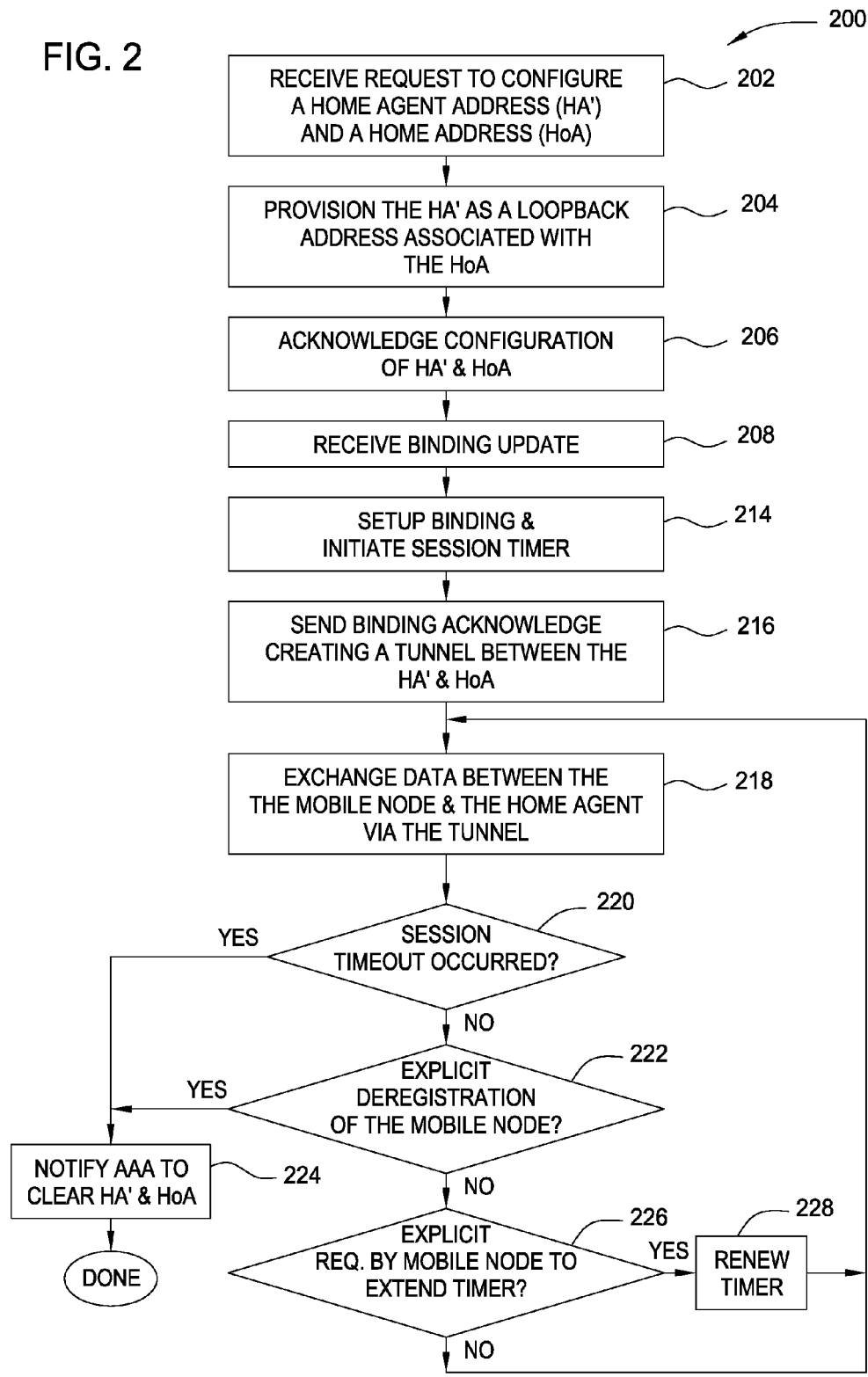
FIG. 2 illustrates a flow diagram of example operations in accordance with some embodiments of the present disclosure.

FIG. 2 illustrates a flow diagram of example operations 200 which may be performed by a device such as the HA 120 in accordance with some embodiments of the present disclosure. The operations begin at 202 with the HA receiving a request to configure a home agent address (HA') and a home address (HoA). If the HA 120 lacks the resources to fulfill the request in its entirety, the HA 120 and the MN 110 may negotiate the conditions of the MN's registration. For example, during registration the MN 110 may request a binding lifetime of 5 hours, but the HA 120 may only have the resources to grant a 3 hour session lifetime. Accordingly, the MN's 110 binding lifetime may be limited to the available time resources of the HA 120.

At 204 the HA 120 provisions the dynamic home agent address HA', which may have been assigned by the AAA server 130, as a loopback address. Further, at 204, the HA 120 associates the dynamic home agent address HA' with the dynamic home address HoA assigned to the MN 110. The association between the dynamic home agent address HA' and dynamic home address HoA may be made in a "mobility binding table" within the logic of the HA 120.

At 206, the HA 120 may send an acknowledgement of the HA'/HoA configuration to the MN 110. Depending on the specific devices attached to the network, the acknowledgement message may be unnecessary. At 208, the HA 120 receives a binding update (BU) from the MN 110. For certain embodiments, if the HA 120 has not received a BU in a predetermined timeout period, the HA 120 may notify the AAA server 130 to clear the dynamic home agent address HA' as well as the dynamic home address HoA.

Once the HA receives a BU from the MN 110, the HA 120 establishes a binding with the MN 110 and initiates a session lifetime timer, as illustrated at 214. The dynamically assigned address pair may be valid only during the session and cleared after the session timer has expired.

At 216, the HA 120 communicates with the MN 110 acknowledging the establishment of the binding. Upon receipt of this acknowledgement, a tunnel is formed between the dynamic home agent address HA' and the dynamic home address HoA. While the HA'/HoA tunnel exists data may be exchanged between the MN 110 and the HA 120, as indicated at 218. Periodically, the HA 120 may evaluate whether or not the session timer has expired, at 220. As described above, the duration of the session timer may be based on the binding lifetime negotiated during the registration process.

Even if the session timer has not expired, the MN 110 may end the session by explicitly deregistering. Therefore, the HA 120 may evaluate whether or not the MN 110 has explicitly deregistered itself, as illustrated at 222. Once the session has ended, via expiration of the session timer or MN deregistration, the HA 120 may notify the AAA server 130 to clear the dynamic home agent address HA' and the dynamic home address HoA, as illustrated at 224. However, the MN 110 may explicitly request to extend the session, if necessary. Accordingly, if the MN 110 has not deregistered itself, then, at 226, the HA 120 may determine if the MN 110 has made an explicit request to extend the session timer.

If the MN 110 has not requested to extend the session timer, the HA 120 and the MN 110 may continue to exchange data via the HA'/HoA tunnel. In contrast, if the MN did request to extend the session, the HA 120 may renew the session timer before continuing to exchange data with the MN 110 via the HA'/HoA tunnel.

Figure 3:
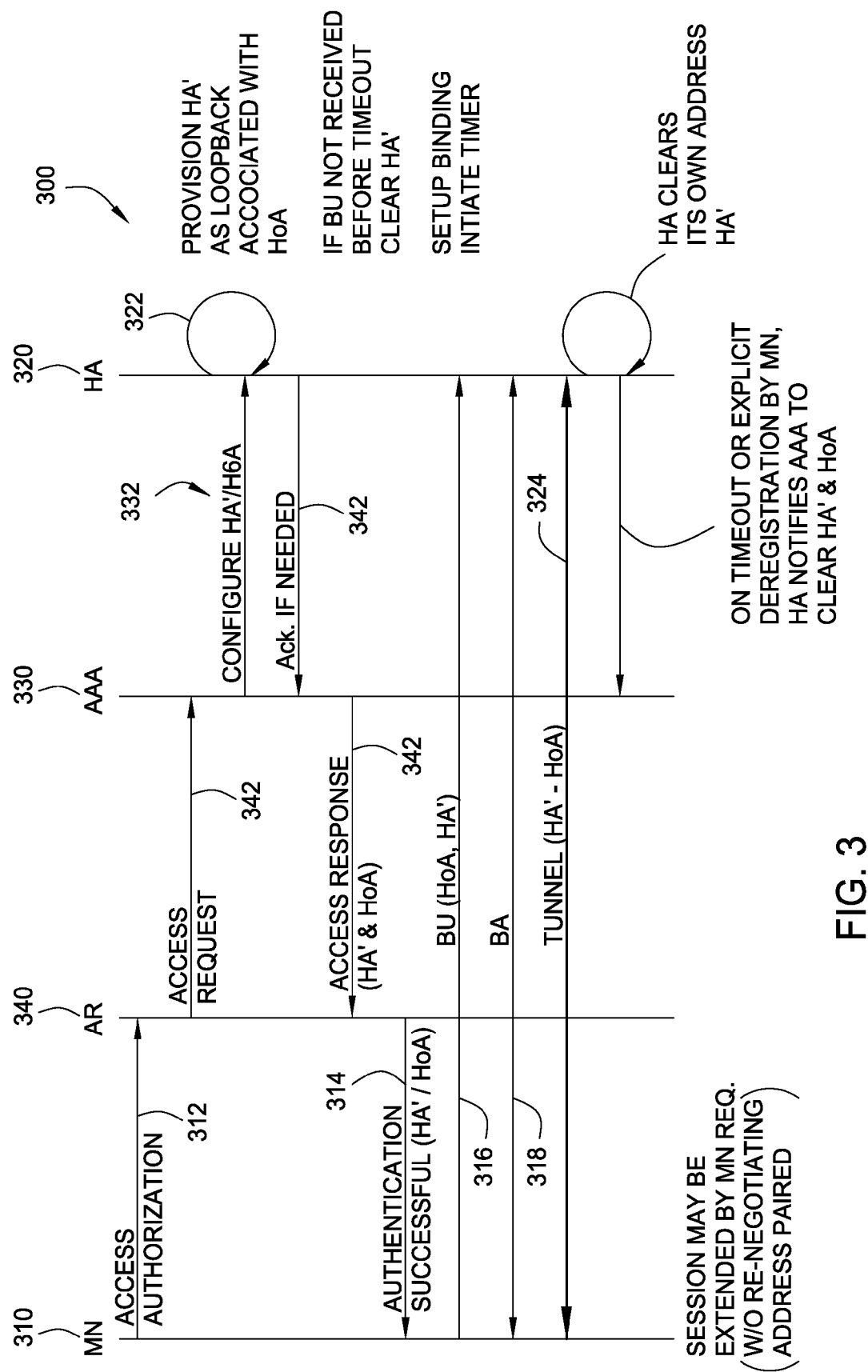
FIG. 3 illustrates a flow of messages between several network devices in accordance with some embodiments of the present disclosure.

FIG. 3 illustrates the flow of messages that may be exchanged between network devices when dynamically assigning a session-based address pair in accordance with the operations shown in FIG. 2. FIG. 3 illustrates the exchange of messages between a mobile node 310 and HA 320, with an access router 340 and AAA 330 serving as arbitrators. During the call flow, the messages received by and sent from the HA 320 correspond to the operations shown in FIG. 2.

The flow of messages begins at 312 with the MN 310 requesting authorization to access the core 350 from the alternative sub-network $112_2$ via the access router 340. In response to receiving the access authorization request 312, the AR 340 may send generate an access request seeking to establish a binding between the HA 320 and the MN 310.

In embodiments of the disclosure, the access request sent by the AR 140 seeking to establish a binding with the HA 320 may be mediated by an AAA server 330. The AAA server 330 may then generate a dynamic HA'/HoA address pair and send a configuration request 332 to the HA 320.

The configuration request may contain the dynamic home agent address HA' and the dynamic home address HoA. As discussed above, the HA 320 may then provision the dynamic home agent address HA' as a loopback address associated with the dynamic home address HoA. If required, the HA 320 may then reply to the AAA server 330 acknowledging the dynamic HA'/HoA address association, as illustrated at 334.

After sending the configuration request 332 to the HA 320, the AAA server 330 may send an access response 344 to the AR 340 communicating the dynamic HA'/HoA address pair. At 314, the AR 340 informs the MN 310 that the access authorization request 312 was granted and the authentication was successful. At this point, the AR 340 may provide the dynamic home agent address HA' and the dynamic home address HoA to the MN 310. DHCP, domain name servers (DNS), or some other method may be used by the MN 310 to obtain the information.

In response to receiving the dynamic home agent address HA', the MN 310 may then send a binding update to the HA 320. Upon receiving the binding update the HA 320 may set up the binding as described above, as well as initiate a binding lifetime timer. After sending a binding acknowledgement 318 to the MN 310 a tunnel 324 may be formed between the MN 310 and the HA 320. While the HA'/HoA tunnel exists data may be exchanged between the MN 310 and the HA 320.

At the end of a session, for example after the session timer expires or after the MN 310 explicitly deregisters, the HA 320 may clear its own address HA' and notify the AAA server to clear the dynamic home agent address HA', as well as the dynamic home address HoA. Since the dynamic HA'/HoA address pair is deleted after the termination of a session, any brute force attack on the dynamic HA address is not feasible. Since the address does not exist, any incoming packets from a brute force attack should not even reach the HA 320. More specifically, routers will not be able to find the MAC for the non-existent address.

However, in some instances it may be desirable for an exchange between the MN 310 and the HA 320 to be extended beyond the originally negotiated session lifetime. For example, available resources on the HA 320 may increase, allowing a longer session time. For long term exchanges between a MN 310 and an HA 320, it may be possible to dynamically change the endpoint addresses with the new addresses being valid for another session time. In fact, in some embodiments, it may also be possible to dynamically change a single endpoint address (e.g., change only the dynamic home agent address HA' in the Mobile IP example above). In such instances, a new pair of addresses may be negotiated, a new session timer may be established, and a new tunnel may be built in parallel, thereby providing a seamless transition to the new address(es).

The change of dynamic endpoint addresses may happen periodically, before the IPSec key pairs need to be changed and renegotiated or before the sequence number reaches a wrapping value. In the latter instance, dynamically changing the endpoint addresses may protect the HA 320 from replay attacks found with the use of static keys. The dynamic change of endpoint address may occur without the AAA server 330 negotiating the new address pair.

Additionally, in some embodiments of the present disclosure, once a new tunnel is operational, traffic may be load balanced between the two tunnels for a period of time. Afterwards, traffic may be diverted away from the old tunnel, and directed to the new tunnel.

The disclosure above makes reference to Mobile IPv6 as a particular protocol in which the present techniques may be utilized as a specific application example in order to facilitate understanding. However, those skilled in the art will appreciate that dynamic server IP address allocation, as described above, may also be applied to various other types of application environments that involves client devices learning about a server's IP address via an AAA infrastructure, specifically where the AAA infrastructure provides the server with its IP address. In such applications, the techniques presented herein may help protect the server by dynamically assigning the server an IP address only for the duration of a single session with the client.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
  receiving a first request to configure a dynamic address pair for use in a communications session between a mobile node device and a home agent device having at least one static address, wherein the dynamic address pair comprises:
    (i) a dynamic home agent address for the home agent device; and
    (ii) a dynamic home address of the mobile node device;
  configuring the dynamic home agent address as a loopback address of the home agent device, that is associated with the dynamic home address of the mobile node device;
  establishing a first tunnel between the dynamic home agent address and the dynamic home address for exchanging data between the home agent device and the mobile node device without the mobile node device having knowledge of the at least one static address of the home agent device, including negotiating a session lifetime for the communications session and in which the mobile node device may be bound to the home agent device, establishing a binding between the dynamic home agent address and the dynamic home address, and initiating a session timer to monitor the session lifetime; and
  transmitting a second request for the mobile node device to discard the dynamic home agent address and the dynamic home address after the communications session has ended, thereby safeguarding the home agent device from brute-force attacks by the mobile node device.

2. The computer-implemented method of claim 1, wherein the second request for the mobile node device to discard the dynamic home agent address is transmitted at the end of the session lifetime.

3. The computer-implemented method of claim 1, further comprising:
  receiving an explicit request to deregister the mobile device before expiration of the session timer; and
  wherein the second request for the mobile node device to discard the dynamic home agent address is transmitted in response to the explicit request as part of a deregistration process.

4. The computer-implemented method of claim 3, further comprising:
  closing the first tunnel between the mobile node device and the home agent device as part of the deregistration process.

5. The computer-implemented method of claim 1, wherein configuring the dynamic home agent address as a loopback address associated with the home address of the mobile node device comprises generating an IP address fixed-length prefix in accordance with a standard communications protocol.

6. The computer-implemented method of claim 5, wherein the fixed-length prefix comprises a 64-bit prefix, wherein the standard communications protocol is the Mobile IPv6 protocol.

7. An apparatus, comprising:
an interface for receiving a first request to configure a dynamic address pair for use in a communications session between a mobile node device and a home agent device having at least one static address, wherein the dynamic address pair comprises:
(i) a dynamic home agent address for the home agent device; and
(ii) a dynamic home address of the mobile node device;
a session timer for monitoring a session lifetime for the communications session and in which the mobile node device may be bound to the home agent device;
logic for configuring, by operation of one or more computer processors, the dynamic home agent address as a loopback address of the home agent device, that is associated with the dynamic home address of the mobile node device, and establishing a first tunnel between the dynamic home agent address and the dynamic home address for exchanging data between the home agent device and the mobile node device without the mobile node device having knowledge of the at least one static address of the home agent device, wherein establishing the first tunnel comprises negotiating the session lifetime, establishing a binding between the dynamic home agent address and the dynamic home address, and initiating the session timer to monitor the session lifetime; and
logic for transmitting a second request for the mobile node device to discard the dynamic home agent address and the dynamic home address after the session timer has expired, thereby safeguarding the home agent device from brute-force attacks by the mobile node device.

8. The apparatus of claim 7, wherein the logic for transmitting the second request is configured to:
transmit the second request for the mobile node device to discard the dynamic home agent address in response to an explicit deregistration request as part of a deregistration process.

9. The apparatus of claim 8, wherein the logic for configuring the dynamic home agent address is configured to:
close the first tunnel between the mobile node device and the home agent device as part of the deregistration process.

10. The apparatus of claim 7, wherein the logic for configuring the dynamic home agent address is configured to generate the dynamic home agent address as an IP address with a fixed-length prefix in accordance with a standard communications protocol.

11. The apparatus of claim 10, wherein the fixed-length prefix comprises a 64-bit prefix, and wherein the standard communications protocol is the Mobile IPv6 protocol.

12. An apparatus, comprising:
an interface for receiving a first request to configure a dynamic address pair for use in a communications session between a mobile node device and a home agent device having at least one static address, wherein the dynamic address pair comprises:
(i) a dynamic home agent address for the home agent device; and
(ii) a dynamic home address of the mobile node device;
means for configuring the dynamic home agent address as a loopback address of the home agent device, that is associated with the dynamic home address of the mobile node device, and establishing a first tunnel between the dynamic home agent address and the dynamic home address for exchanging data between the home agent device and the mobile node device without the mobile node device having knowledge of the at least one static address of the home agent device, wherein establishing the first tunnel comprises negotiating a session lifetime for the communications session and in which the mobile node device may be bound to the home agent device, establishing a binding between the dynamic home agent address and the dynamic home address, and initiating a session timer to monitor the session lifetime; and
means for transmitting a second request for the mobile node device to discard the dynamic home agent address and the dynamic home address after the communications session has ended, thereby safeguarding the home agent device from brute-force attacks by the mobile node device.

13. The apparatus of claim 12, wherein the means for transmitting is configured to send the second request for the mobile node device to discard the dynamic home agent address upon expiration of the session timer.

14. The apparatus of claim 12, wherein the means for transmitting the second request is configured to:
transmit the second request for the mobile node device to discard the dynamic home agent address in response to an explicit deregistration request as part of a deregistration process.

15. The apparatus of claim 14, wherein the means for configuring the dynamic home agent address is configured to:
close the first tunnel between the mobile node device and the home agent device as part of the deregistration process.

16. The apparatus of claim 12, wherein the logic for configuring the dynamic home agent address is configured to generate the dynamic home agent address as an IP address with a fixed-length prefix in accordance with a standard communications protocol.

17. The apparatus of claim 16, wherein the fixed-length prefix comprises a 64-bit prefix, and wherein the standard communications protocol is the Mobile IPv6 protocol.

18. The apparatus of claim 17, wherein the apparatus is to facilitate safeguarding the home agent device, having the at least one static address, from brute-force attacks by a client comprising the mobile node device, wherein the means for transmitting the second request is configured to transmit the second request for the mobile node device to discard the dynamic home agent address in response to an explicit deregistration request as part of a deregistration process;
wherein the means for configuring the dynamic home agent address is configured to close the first tunnel between the mobile node device and the home agent device as part of the deregistration process.

19. The apparatus of claim 18, wherein the explicit request to deregister the mobile device is received in a first instance, wherein the apparatus further comprises:
means for, in a second instance and upon receiving an explicit request to extend the session lifetime for the communications session, configuring a second dynamic address pair for use during the extended session lifetime, wherein the second dynamic address pair comprises, in respective instances: (i) the dynamic home agent address and the dynamic home address; (ii) a different dynamic home agent address and the dynamic home address; (iii) the dynamic home agent address and a different dynamic home address; and (iv) a different dynamic home agent address and a different dynamic home address.

20. The apparatus of claim 19, wherein in parallel, the second dynamic address pair is negotiated, a session timer is initiated to monitor the extended session lifetime, and a second tunnel is established based on the second dynamic address pair, thereby providing a seamless transition to the second dynamic address pair; wherein the apparatus further comprises:

means for load balancing network traffic in the second instance and between the first tunnel and the second tunnel for a predefined period of time; and means for, upon the predefined period of time elapsing, diverting network traffic from the first tunnel to the second tunnel in the second instance.

* * * * *